US007940324B2

(12) United States Patent
Hibino et al.

(10) Patent No.: US 7,940,324 B2

(45) Date of Patent: May 10, 2011

(54) METHOD OF EXPOSURE CONTROL AND IMAGE PICKUP APPARATUS

(75) Inventors: Yutaka Hibino, Komaki (JP); Yoshihiko Nakayama, Anjyo (JP); Masataka Furuya, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 601 days.

(21) Appl. No.: 12/082,528

(22) Filed: Apr. 11, 2008

(65) Prior Publication Data

US 2009/0015707 A1 Jan. 15, 2009

(30) Foreign Application Priority Data

Apr. 13, 2007 (JP) ................................ 2007-105750

(51) Int. Cl.
*G03B 7/00* (2006.01)

(52) U.S. Cl. ...................................................... 348/362

(58) Field of Classification Search ........................ None
See application file for complete search history.

(56) References Cited

U.S. PATENT DOCUMENTS

| | | | | |
|---|---|---|---|---|
| 5,146,259 | A | 9/1992 | Kobayashi et al. | |
| 7,292,280 | B2 * | 11/2007 | Yamazaki et al. | 348/363 |
| 7,570,837 | B2 * | 8/2009 | Hori | 382/274 |

FOREIGN PATENT DOCUMENTS

| | | |
|---|---|---|
| GB | 2229542 | 9/1990 |
| GB | 2274173 | 7/1994 |
| JP | 62-006232 | 1/1987 |
| JP | 62-288817 | 12/1987 |
| JP | 02-075285 | 3/1990 |
| JP | 11-183778 | 7/1999 |

* cited by examiner

*Primary Examiner* — Justin P Misleh
(74) *Attorney, Agent, or Firm* — DLA Piper LLP (US)

(57) ABSTRACT

A method of exposure control in an image pickup apparatus includes determining whether a zoom lens has been moved, determining whether an F value obtained from information about focal position of a focus lens linked to movement of the zoom lens has changed, estimating a variation in the focus luminance before and after a change in the F value from the F values before and after the change when the F value has been changed, changing the shutter speed determined according to a focus luminance before the change to a shutter speed determined according to the focus luminance after the change, based on the estimated variation in the focus luminance, and changing a frame rate determined according to the focus luminance before the change to a frame rate determined according to a focus luminance after the change according to the changed shutter speed.

5 Claims, 7 Drawing Sheets

AE CONTROL LOOP
S10 OBTAINING AVERAGE OBJECT LUMINANCE VALUE AND AVERAGE WHITE CONTENT RATE
S15 IS ZOOM LENS BEING MOVED?
S20 PAST ZOOM LENS BEING MOVED?
S25 AE DATA ENTERD?
S30 DETECTING OBJECT LUMINANCE AND OBTAINING WHITE CONTENT RATE
S35 OBTAINING NEW AVERAGE OBJECT LUMINANCE VALUE AND NEW AVERAGE WHITE CONTENT RATE
S40 CORRECTING WHITE BALANCE
S45 CORRECTING AVERAGE OBJECT LUMINANCE VALUE TO SET LUMINANCE VALUE BACED ON WHITE BALANCE CORRECTION RATE
S50 CHANGING TO SHUTTER SPEED CORRESPONDING TO SET LUMINANCE VALUE
S100 F VALUE CHANGING?
S105 ESTIMATING AMOUNT OF CHANGE IN FOCAL LUMINANCE AND CHANGING SHUTTER SPEED
S110 CHANGING FRAME RATE ACCORDING TO AN AMOUNT OF CHANGE IN FOCAL LUMINANCE
S115 SET CHANGED SHUTTER SPEED AND FRAME RATE
S120 SET FRAME RATE COMPLETED?
S125 STOPPING ZOOMING
S130 CHANGING FRAME RATE

5A

5B

5C

5D

METHOD OF EXPOSURE CONTROL AND IMAGE PICKUP APPARATUS

CROSS-REFERENCE TO RELATED APPLICATIONS

This application is based upon and claims the benefit of priority from the prior Japanese Patent Application No. 2007-105750, filed on Apr. 13, 2007, the entire contents of which are incorporated herein by reference.

BACKGROUND OF THE INVENTION

1. Field of the Invention

The present invention relates to a method of exposure control and an image pickup device realizing the exposure control method.

2. Description of the Related Art

Image pickup apparatus such as digital cameras comprise a solid-state image sensor such as a charge coupled device (CCD) or a complementary metal oxide semiconductor (CMOS). The solid-state image sensor is provided in a lattice-like arrangement on an imaging plane. The image sensor is exposed to light and electrical charge by light reception is sequentially transferred to be read out by a signal control section or the like so that an image is taken. Subsequently, an analog signal is converted into a digital output value by AD conversion. A white balance correction and the like are applied to the image signal, whereupon a static image (hereinafter, "frame") to be delivered to a display device etc. is formed. A time for exposure of an image sensor to light is controlled by a shutter speed of an electronic shutter in the image pickup apparatus. A charge transfer interval or charge readout timing is controlled by the signal control section or the like so that an exposure value of image to be taken is controlled, whereby the luminance of output image is controlled.

The aforenoted frame is formed at a predetermined number of times per second in digital cameras and the like (hereinafter, "frame rate"), thus composing an image. A frame rate at the image output side is fixed to a predetermined number of times in a range from 30 to 60 times per second. At the input side of the signal control section, a charge transfer interval or charge readout timing is controlled, whereby a frame rate is controlled so as to be varied, whereby the same effect as achieved by a diaphragm mechanism (mechanical iris).

Furthermore, an exposure value depends upon an amount of light of an object and around the object (hereinafter, "object luminance") obtained by a photometric function of the image pickup apparatus. When the object luminance has been changed, the shutter speed of the image sensor or an input side frame rate is controlled to be switched to a previously set value by an automatic exposure control (hereinafter, "AE control").

The AE control is generally carried out after a focal position has been determined by an automatic focus control (hereinafter, "AF control") unit in which a focus lens is moved to a preset position with movement of a zoom lens. Furthermore, AF control manners include a mountain-climbing type in which a zooming speed is controlled by a zoom switch or the like so that a focus lens is moved as soon as possible relative to the position of the zoom lens, thereby being focused on the object. An exposure value set according to the position of the focus lens is supplied to a signal control section or the like when a zooming speed is controlled by the AF control or the like. As a result, there arises no problem resulting in excessive or insufficient exposure.

However, the following two problems arise when the zoom lens is manually operated at high speeds. In the first problem, when the zoom lens is moved from a wide-angle end to a telephoto end, the AE control cannot follow the zooming speed, whereupon exposure becomes excessive such that an output image becomes white or flies white. Furthermore, in the second problem, when the zoom lens is moved from the telephoto end to the wide-angle end, the AE control cannot follow the zooming speed alike, whereupon exposure becomes insufficient such that an output image becomes dark.

In view of the problems, JP-A-H11-183778 discloses a control method of comparing zooming speed information with a threshold value. When a zoom lens is moving at a speed exceeding the threshold value, it is determined that an amount of peripheral light is rapidly changing. In this case, a maximum aperture diameter of a diaphragm is changed in accordance with a focal distance.

However, in the case where the maximum aperture diameter of the diaphragm which is based on the position of the zoom lens is controlled in accordance with the zooming speed, photometry and AE control need to be re-executed upon completion of zooming when the luminance on an imaging plane of the image sensor (hereinafter, "focal luminance") does not agree with the luminance corresponding to a previously set maximum aperture diameter of the diaphragm. In this case, there is a possibility that the brightness may change as described above although the change is transient, whereupon the changes in the focal luminance cannot sufficiently be suppressed.

SUMMARY OF THE INVENTION

Therefore, an object of the present invention is to provide an exposure control method which can maintain the brightness of output image at a constant value even when the focal luminance is suddenly changed by high-speed zooming or by changes in the luminance of an external object such as lightning detection, and an image pickup apparatus realizing the exposure control method.

In one aspect, the resent invention provides a method of exposure control in an image pickup apparatus which includes an image sensor comprising a solid-state image sensing device, a zoom lens and a focus lens each moved along a light axis, a light receiving element, a white balance changing unit which carries out color correction for an image taken on the basis a rate of while color contained in the taken image, an automatic exposure control unit which changes an exposure time based on color correction processing by the white balance changing unit, a shutter speed and a frame rate of the image sensor, an autofocus control unit which links the focus lens to movement of the zoom lens, and a photometric unit comprising a light receiving element, the method comprising determining whether or not the zoom lens has been moved, based on information about a zooming position of the zoom lens obtained by the autofocus control unit, determining whether or not an F value obtained from information about focal position of the focus lens linked to movement of the zoom lens has changed, estimating variations in the focus luminance before and after a change in the F value from the F values before and after the change when the F value has been changed, changing the shutter speed determined according to a focus luminance before the change to a shutter speed determined according to the focus luminance after the change, based on the estimated variations in the focus luminance, and changing the frame rate determined according to the focus luminance before the change to a frame rate determined according to a focus luminance after the change according to the changed shutter speed.

According to the above-described method, when the focus lens is moved with delay relative to the movement of the zoom lens, whether the zooming speed is high or not is determined depending upon whether the F value is changed or not. When the F value has been changed, the focus lens lags behind the zoom lens, namely, it is determined that the focus luminance has changed and the brightness of output image has changed. Then, the shutter speed in the normal processing of the AE control is forced into a change. Consequently, the change in the brightness in the output image can be suppressed.

In one embodiment, when whether the zoom lens has been moved is determined based on the information about the position of the zoom lens and the zoom lens has been determined to be in motion even in the case where the F value has not been changed, the frame rate determined according to the focus luminance before movement of the zoom lens is changed to a frame rate determined according to the focus luminance after the movement of the zoom lens, and the shutter speed determined according to the focus luminance before the movement of the zoom lens is changed to a shutter speed determined according to the focus luminance after the movement of the zoom lens.

According to the above-described method, it is determined that the AF control is appropriate in the case where the zoom lens is determined to be in motion even when the F value does not change. In this case, the shutter speed is controlled so as to match the zooming speed. Consequently, the brightness of the output image can be maintained at a constant value.

In another embodiment, in a case where the object luminance monitored at a constant frequency by the photometric unit even when the zoom lens has not been moved and the F value has been unchanged, the shutter speed is changed according to a ratio of consecutive two of the object luminance values whose changes are periodically detected.

When the object luminance metered by the photometry unit for every period has change, a change ratio is obtained from two consecutive values successive two of the object luminance values whose changes are periodically detected. The shutter speed is changed according to the change ratio. Accordingly, even if a white color resulting in a change in the luminance externally other than zooming, a shutter speed to be changed can be obtained by comparison of the object luminance values before and after the change. When image pickup is executed using the changed shutter speed, the changes in the brightness of output image can be suppressed.

In further another embodiment, the ratio has an initial value which is a first ratio of an average object luminance value obtained by averaging object luminance monitored by the photometric unit for a predetermined period of time and an object luminance value at which a change has initially been detected by photometric unit, the shutter speed changed according to the initial value is set as a reference shutter speed, a second ratio of consecutive two of subsequently sequentially detected object luminance values is compared with the initial value, and the reference shutter speed is replaced by a shutter speed changed according to the second ratio when the second ratio does not correspond to the initial value.

The object luminance values monitored for a predetermined period of time are averaged, so that an averaged object luminance value is obtained. An initial change ratio refers to a change ratio of the average object luminance value and the object luminance value at the time of initial detection of the change. On the basis of a shutter speed changed according to the initial change ratio, a change ratio obtained from a subsequently sequentially detected object luminance and the average object luminance value are compared with each other. When the ratios do not correspond to each other, the shutter speed changed by the change ratio is corrected into a reference shutter speed. Consequently, since the shutter speed is corrected so as to be changed constantly at a change ratio obtained from an initially detected amount of change, a change in the focal luminance can be rendered substantially constant. Consequently, a change in the brightness of an image can be prevented from sudden change.

In another aspect, the invention provides an image pickup apparatus comprising an image sensor comprised of a solid-state image sensing device, a zoom lens and a focus lens each moved along a light axis, a light receiving element, a white balance changing unit which carries out color correction for an image taken on the basis a rate of while color contained in the taken image, an automatic exposure control unit which changes an exposure time based on color correction processing by the white balance changing unit, a shutter speed and a frame rate of the image sensor, an autofocus control unit which links the focus lens to movement of the zoom lens, and a photometric unit comprising a light receiving element, a zooming detection unit which detects movement of the zoom lens, an F value detection unit which detects information about a focal position of the focus lens moved in conjunction with the zoom lens, thereby detecting a change in the F value, a focus luminance estimation unit which estimates a variation in the focus luminance on an imaging plane of the image sensor based on a movement distance of the zoom lens detected by the zooming unit, or an increase or decrease in an amount of light passing through the lens, the amount of light being detected by the F value detection unit, a shutter speed change unit which changes the shutter speed during control by the automatic exposure control unit, based on the estimated variation in the focus luminance, and a frame rate change unit which changes the frame rate during control by the automatic exposure control unit, based on a movement distance of the zoom lens detected by the zooming detection unit.

According to the above-described configuration, an amount of change in the focal luminance can be estimated using known AE control unit and AF control unit. Consequently, since the conventional AE control unit and AF control unit can be used, the manufacturing costs of the image pickup apparatus can be suppressed.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
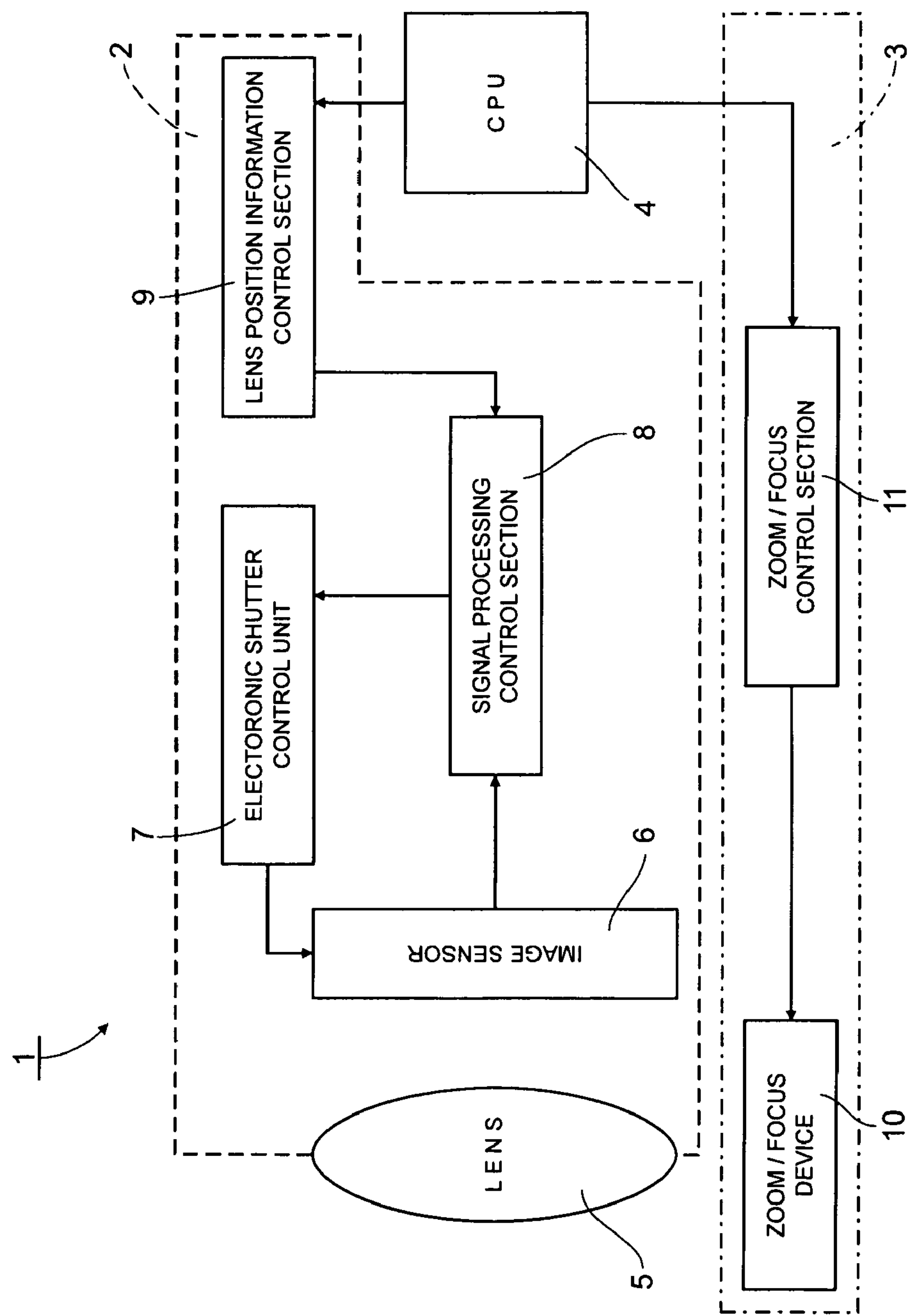
FIG. 1 is a block diagram of an image pickup apparatus of an embodiment.

An embodiment will be described with reference to the accompanying drawings. Referring to FIG. 1, an arrangement of an image pickup apparatus 1 of the embodiment is shown. The image pickup apparatus 1 comprises an image pickup section 2, an autofocus (AF) control section 3 and a central processing unit (CPU) 4. The image pickup section 2 comprises a lens group 5, an image sensor 6, an electronic shutter control section 7, a signal processing control section 8 and a lens position control section 9.

The lens group 5 comprises a plurality of lenses such as a zoom lens and a focus lens but is shown as a single lens for the sake of simplicity in FIG. 1. The image sensor 6 is made by arranging a solid-state image sensing device comprising a charge coupled device (CCD) into a lattice shape. The solid-state image sensing device is located on an imaging plane in the rear of the lens group 5. The electronic shutter control section 7 oscillates pulses for every predetermined period to control a shutter speed of the image sensor 6. The signal processing control section 8 executes processing to control a timing to read an image signal comprised of electric charge of the solid-state image sensing device of the image sensor 6, thereby delivering an image signal to an external storage medium or the like. The lens position information control section 9 executes processing to transfer to the signal processing control section 8 information about positions of the zoom and focus lenses, which information has been transferred thereto from the CPU 4. The CCD of the image sensor 6 or the like also serve as a photometric unit which measures an object luminance as a light receiving device used for the AF control, the AE control or the like. Aside from the image sensor 6, a photometric unit comprising a greenockite (CdS) cell may be provided.

The AF control section 3 comprises a zoom/focus device 10 and a zoom/focus control section 11. The zoom/focus device 10 is provided with a position adjustment unit capable of adjusting a plurality of zoom lenses and focus lenses composing the lens group 5 individually. The zoom/focus control section 11 is provided with an autofocus (AF) control unit adjusting a position of the focus lens to a focal position according to a position of the zoom lens. The CPU 4 delivers an F value according to the zoom lens to the zoom/focus control section 11 and position information of the zoom lens and focus lens corresponding to the F value to the signal processing control section 8. The F value according to the position of the zoom lens is stored as a data table on data base formed on the external storage medium although not shown in the drawings.

Figure 2:
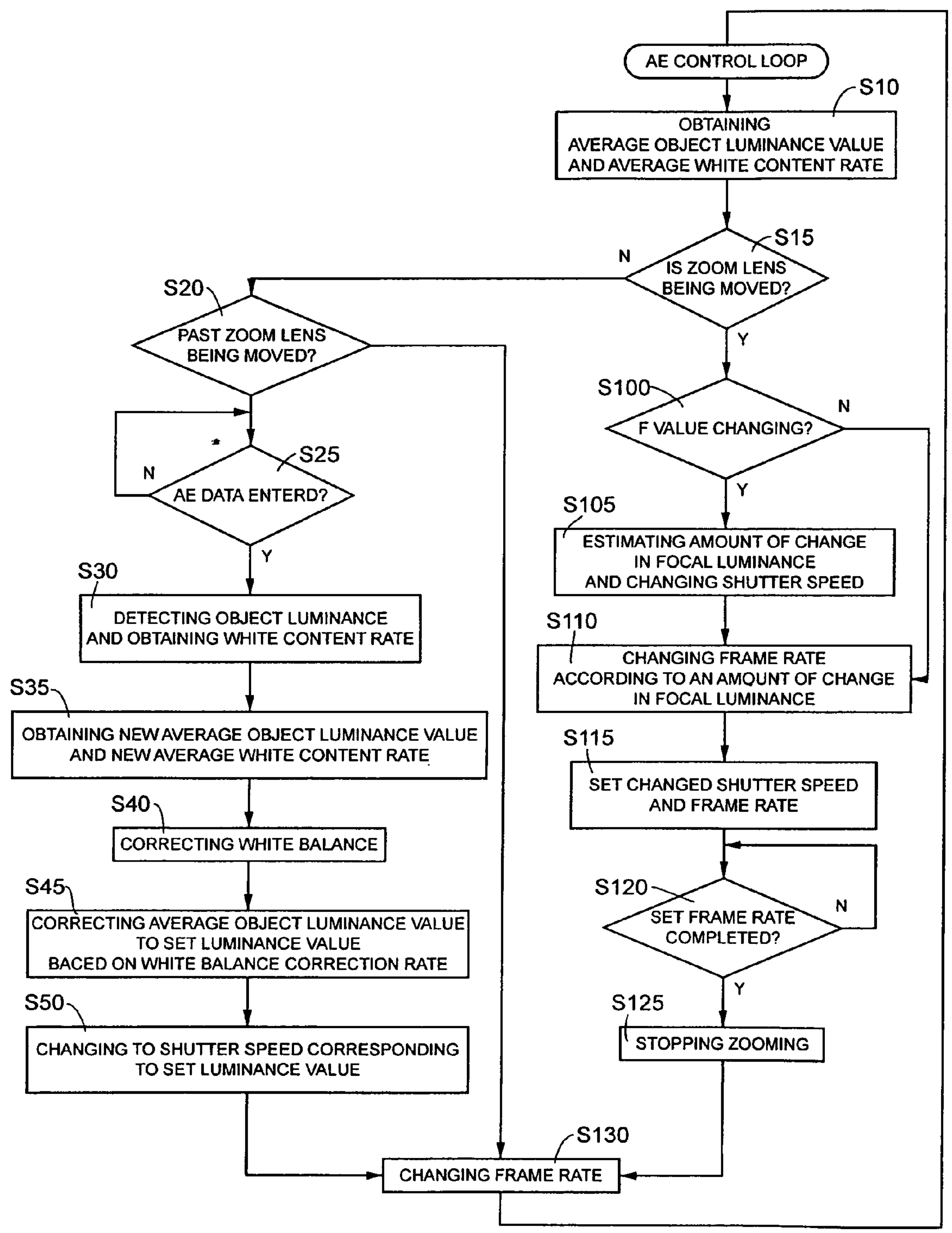
FIG. 2 is a flowchart showing an exposure control method of the embodiment.

Exposure is controlled in the following manner regarding the image pickup apparatus 1 configured as described above. FIG. 2 is a flowchart schematically showing an exposure control method. In the following description, one frame designates a static image taken by the image sensor, and a frame rate refers to the number of frames read within a unit time. An F value refers to a value obtained by dividing a focal distance of a lens by an effective diameter of the lens. Furthermore, an object luminance refers to an amount of light of and around an object. A focal luminance refers to an amount of light on an imaging plane in the rear to the lens.

In the normal AE control, exposure is controlled for every predetermined period. Average values are obtained from an object luminance value measured for every past period and a rate of white color contained in a frame formed in the past (hereinafter, “white color content rate”) respectively at step S10. Then, when it is determined at step S15 that the zoom lens is not in motion and it is determined at step S20 that the zoom lens was not moved in the past, the normal AE control is carried out at step S25 and subsequent steps. The CPU is on standby for input of AE data at step S25. The AE data includes an object luminance obtained by the photometric unit and an original image before correction formed on the imaging plane of the image sensor. When AE data has been supplied, the CPU advances to step S30. The CPU executes processing to relate an object luminance to the original image. The object luminance is obtained by the photometric unit from newly supplied AE data. Simultaneously, processing is carried out so that a white color content rate is obtained to obtain a proper white balance of an image.

Renewal processing is carried out at step S35. In the renewal processing, a new average object luminance is obtained from the average object luminance obtained at step S10 and the object luminance value related at step S30. In parallel with the average object luminance value renewal processing, a new average white content rate is obtained from the average white content rate obtained at step S10 and the white content rate obtained at step S30. When the average luminance value and the white content rate are obtained, minute variations in the object luminance value and the white content rate with changes in surroundings around the object are absorbed by the obtained average values. Accordingly, an output image displayed on a display or the like can be prevented from flickers.

At step S40, a correction rate is obtained from the obtained average white content rate and a set white content rate which sets a rate of white contained in one frame so that an output image has a brightness previously set at the image pickup apparatus side. A white balance correction process is carried out so that the average white content rate is corrected into the set white content rate based on the correction rate. At step S45, a set luminance correcting process is carried out so that the average object luminance value is corrected into the set luminance value previously set at the image pickup apparatus side based on the correction rate obtained at step S40. At step S50, a shutter speed change process is carried out so that an amount of change of the shutter speed of the image sensor 6 is determined from the difference between the set luminance value corrected at step S45 and the average luminance value.

At step S130, a frame rate is changed based on the shutter speed changed at step S50 so that an output image has a previously set brightness. A suitable exposure value can be obtained since the shutter speed is changed at step S50 and the frame rate from which a corresponding aperture effect is achieved is changed. On the other hand, when it is determined at step S20 that the past zoom lens has been moved, the foregoing AE control is not carried out. In this case, it is determined that the AE control for a high-speed zooming has already been carried out with movement of the zoom lens. Accordingly, the CPU advances to step S130 where adjustment of frame rate and the like is carried out, whereupon the shutter speed of the image sensor changed for the high-speed zooming can be prevented from being returned to the previous value by the normal AE control.

The above-described steps are carried out for every period. When the movement of the zoom lens has been detected at step S15, the normal AE control is interrupted and the following AE control is carried out. At step S100, it is determined whether the F value has changed. When the F value has changed, the control sequence advances to step S105. In this case, the F value changes since the AE control is not in time since the reaction of the focus lens is delayed relative to the zooming speed. As a result, the focal distance and effective diameter of the lens cannot be retained at a constant value. On the other hand, when the F value has not changed, the control sequence advances to step S110. In this case, since the focus lens follows the zooming, the relationship between the focal distance and effective diameter of the lens is retained at a constant value, the F value does not change.

At step S105, it is determined that the focal luminance is in the state of excessive or insufficient exposure by adverse effect of changes in the F value due to high-speed zooming. In this case, an amount of change in the focal luminance is estimated. The shutter speed is changed based on the estimated change amount. The luminance is a value of amount of light flux passing through a unit area of the lens, whereas the F value has a relation to a diameter of the lens through which light flux passes. Accordingly, the luminance is presented as the following expression (1):

$$\frac{L_f}{L_{f0}} = \left(\frac{F_0}{F}\right)^2$$

where $L_{f0}$ is a focal luminance before a change, $L_f$ is a focal luminance after the change, $F_0$ is an F value before the change and F is an F value after the change. Furthermore, a time for which the image sensor is exposed to light, namely, a shutter speed is determined in proportion to an object luminance. Accordingly, a change in the object luminance and a change in the shutter speed are presented as the following expression (2):

$$\frac{L}{L_0} = \frac{T}{T_0}$$

where $L_0$ is an object luminance before the change, L is an object luminance after the change, $T_0$ is a shutter speed before the change and T is a shutter speed after the change.

When the object luminance and the focal luminance is equal to each other, left parts of mathematical expressions (1) and (2) are cancelled by each other. In this case, the shutter speed after the change can be obtained from the shutter speed and F value before the change as shown by the following expression (3). Accordingly, the shutter speed in the case of sudden change in the exposure value by high-speed zooming can be obtained by comparing the F values before and after the change:

$$T = T_0\left(\frac{F_0}{F}\right)^2$$

The timing of the shutter is controlled in a pulse control manner by the electronic shutter control section. Accordingly, when the F values are compared before and after the consecutive shutter timings, a change in the shutter speed per shutter operation can be obtained. In this case, however, the shutter speed is minutely changed for every occasion. This results in an adverse effect on an exposure value.

In view of this problem, the shutter speed is changed in conjunction with the subsequent step S110. Processing for changing a frame rate is carried out at step S110. Changes in the F values at start and terminal ends of high-speed zooming are compared with each other so that a shutter speed at the terminal end is obtained from a shutter speed at the start end. The frame rate is then changed so that an exposure value is maintained at a constant value. An exposure value depends upon a sum of a shutter speed value and an aperture value by the frame rate control. Accordingly, when the shutter speed is increased, the frame rate is reduced so that the number of images read from the solid-state image pickup element in a unit time is reduced. On the other hand, when the shutter speed is slow, the frame rate is increased so that the number of images read from the solid-state image pickup element in a unit time is increased.

The total number of frames contained in the frame rate determined by the foregoing processing is divided by a total amount of changes in the F value, whereby an amount of change in the F value for every frame is determined. In parallel with the processing, the shutter speed is changed step by step for every shutter operation based on an amount of change in the F value. Furthermore, the processing at step S110 is sometimes carried out when step S105 has been passed through as well as when the shutter speed has been changed at step S105. In this case, the AF control is carried out properly and the F value is maintained at a constant value. However, since the focal distance and the aperture value are changed with a zooming operation, the frame rate needs to be changed so that the exposure value is maintained at a constant value.

At step S115, an electronic shutter optimizing process is carried out. More specifically, the frame rate determined at step S110 is executed by the signal processing control section 8 so that the shutter speed for every frame contained in the determined frame rate is carried out by the electronic shutter control section 7. As a result, the exposure value can be maintained at a constant value by the optimized shutter speed and frame rate. Furthermore, the brightness of a display or the like can be changed at a predetermined rate even during the zooming operation.

At step S120, the CPU is on standby until the set frame rate is completed. When it is determined that the frame rate has been completed, the control sequence advances to step S125 to stop the zooming operation. When the zooming operation has been stopped, exceptional processing of the AE control with the above-described high-speed zooming is not necessary. However, the frame rate changes between the start and terminal ends of the zooming. Since the exposure value at the terminal end is set on the terminal end frame rate, the frame rate before the zooming operation is changed to a frame rate after the zooming operation at step S130. The control sequence then returns to the normal AE control loop at step S10.

In the above-described AE control loop, when the focal luminance has changed by the movement of the zoom lens or changes in the F value, both shutter speed and frame rate are changed so that the changes in the focal luminance are suppressed. However, even when the zoom lens is not in operation currently or has not been operated and is unchanging, correction is carried out by the white balance in the AE control. Accordingly, for example, when white paper or the like is inserted on the imaging plane, the rate of white contained in the image is rapidly changed such that there is a case where it is determined that the object luminance has suddenly changed. In this case, triggers used in the above-described AE control loop, such as movement of the zoom lens or changes in the F value, cannot be used. As a result, the aforesaid sudden change in the object luminance cannot be coped with.

Figure 3:
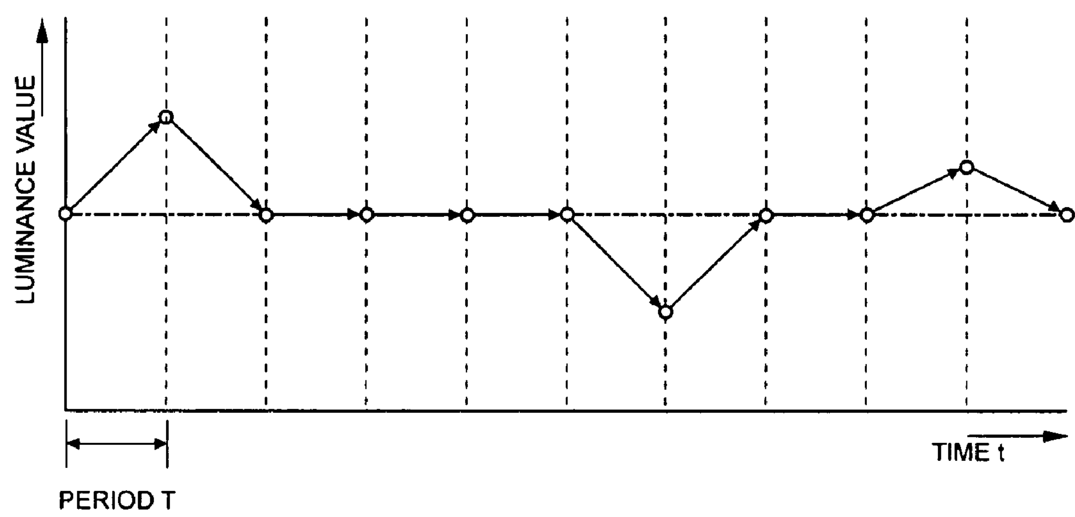
FIG. 3 shows distribution of focal luminance with vertical change measured by the image pickup apparatus.
Figure 4:
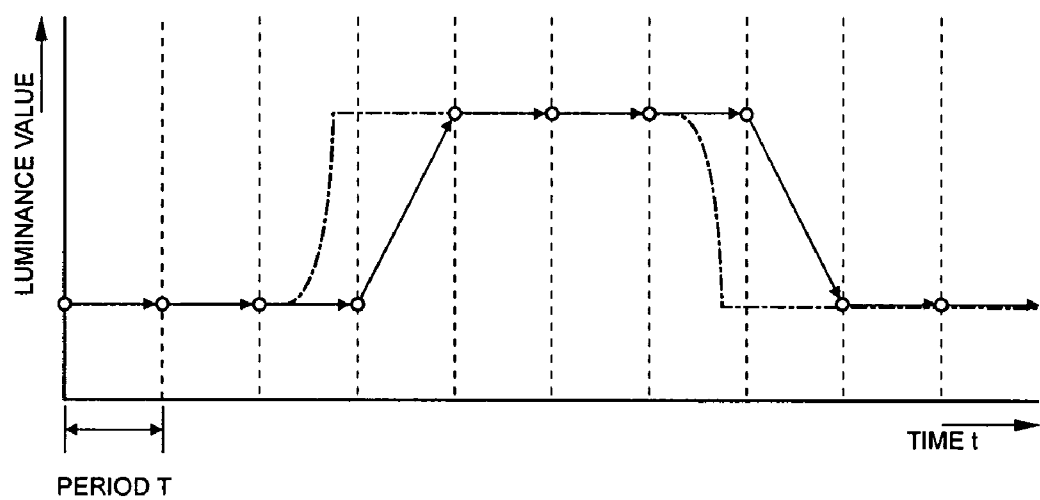
FIG. 4 is a graph showing changes in focal luminance in the case where the AE control has been re-executed for the focal luminance measured by the image pickup apparatus.

In the above-described case, the exposure is controlled in the following manner so that changes in the brightness of output screen is suppressed by suppressing changes in the focal luminance based on changes in the object luminance. FIG. 3 shows distribution of focal luminance in the case where the object luminance has repeatedly changed by white detection or the like. In FIG. 3, the focal luminance shown by dot line is obtained from an average object luminance value which is obtained by averaging object luminance values monitored by a predetermined time. FIG. 4 shows distribution of focal luminance in the case where the object luminance changes after white detection and the object luminance values monitored for every predetermined period are accumulated in chronological order and the average object luminance value is renewed. The focal luminance shown by dot line in FIG. 4 is obtained from an average object luminance value which is obtained by averaging object luminance values monitored by a predetermined time. Furthermore, a plurality of circles "o" shown in FIGS. 3 and 4 designate focal luminance.

When the object luminance has suddenly changed due to a rapid change in color environment around the camera, the shutter speed is firstly changed and the frame rate is secondly changed in order that an exposure value is maintained at a constant value. When the frame rate is controlled, it is easy to change the frame rate at a constant rate by averaging an amount of change in the object luminance from a start end of the change in the object luminance to a terminal end thereof. However, this method lacks in readiness. Accordingly, in the embodiment, the object luminance is changed by the shutter speed so that the change in the focal luminance is suppressed.

In the image pickup apparatus 1 having a pulse-controlled electronic shutter, the object luminance is measured by a photometric unit synchronized with the electronic shutter. A luminance L after a change relative to a luminance $L_0$ before the change generally has a proportional relation with a shutter speed Tv after the change relative to a shutter speed $T_{v0}$ before the change. The proportional relation is shown by the following expression (4):

$$\frac{L}{L_0} = \frac{Tv}{Tv_0}$$

However, when the object luminance minutely changes for every period of monitor by the photometric unit, the shutter speed also changes in conjunction with the change in the object luminance. Accordingly, an output screen flickers such that it is difficult to view the output screen. In view of the circumstances, as shown in FIGS. 3 and 4, the object luminance measured for every predetermined period is corrected to a suitable focal luminance as an average object luminance value. The following expression (5) represents the relationship between the shutter speed $T_{vn-1}$ at which an image is taken with an object luminance $L_{n-1}$ and the consecutively measured shutter speed $T_{vn}$ with an object luminance $L_n$:

$$Tv_n = \frac{L_n}{L_{n-1}} Tv_{n-1}$$
$$(n = 1,2,3, \ldots)$$

As obvious from the above expression (5), the shutter speed $T_{vn}$ relative to the subsequent object luminance $L_n$, shown in the left part can be obtained from a ratio of object luminance before and after the change, $L_n/L_{n-1}$ and shutter speed $T_{vn-1}$ relative to the previous object luminance $L_{n-1}$. Here, $L_0$ denotes an average object luminance value of object luminance values monitored for every predetermined period. $L_1$ denotes an initially measured object luminance in the case where the object luminance changes. When a ratio of $L_1$ to $L_0$ is an initial value, an object luminance $L_2$ at the subsequent shutter operation is estimated as shown in FIG. 5A.

Figure 5:
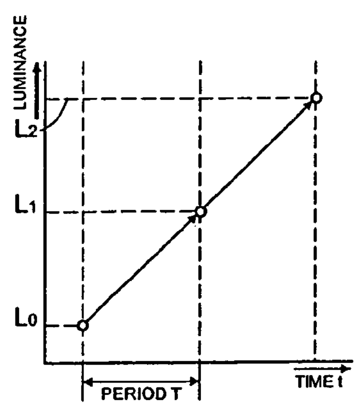
FIGS. 5A to 5D show correction patterns of the focal luminance for the focal luminance in the exposure control method of the embodiment.
Figure 5:
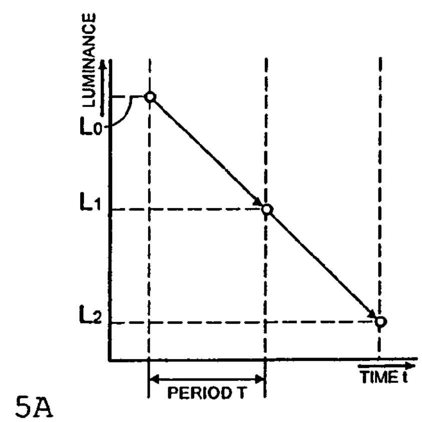
Figure 5:
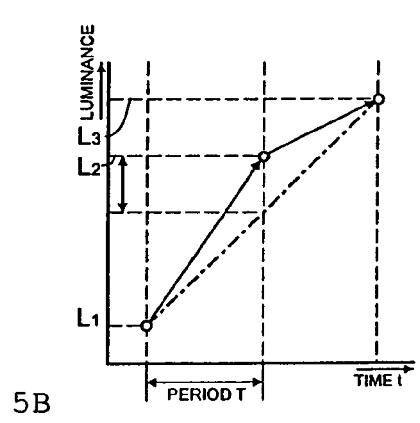
Figure 5:
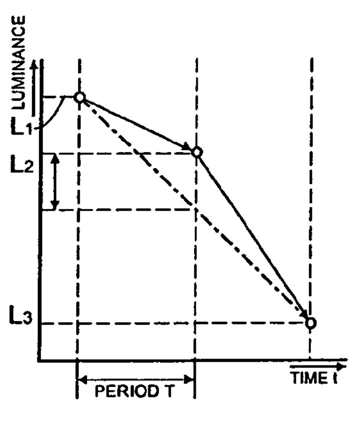
Figure 5:
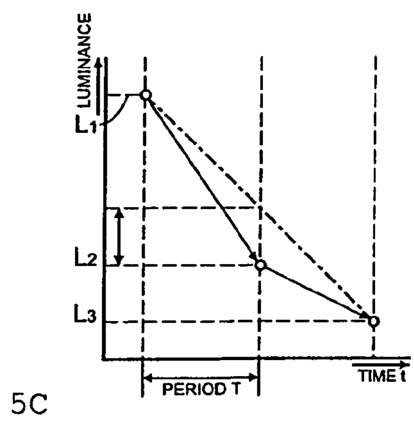
Figure 5:
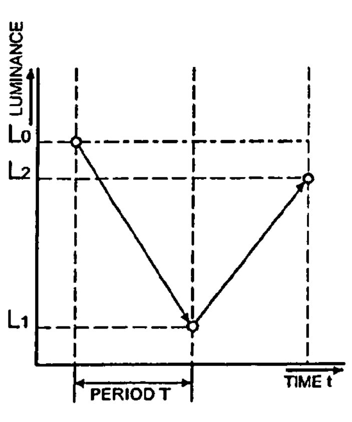
Figure 5:
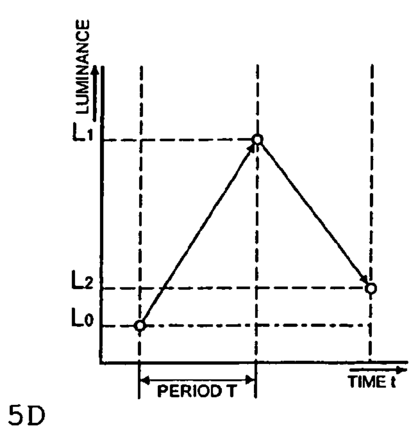

However, when the subsequent object luminance $L_2$ is darker or brighter than the object luminance $L_1$, changes in the object luminance in this case are shown by FIGS. 5B and 5C. Thus, when the object luminance is displaced from an estimated change, the correction as shown in the following is carried out so that the focal luminance is corrected when the object luminance changes, thereby the output screen can be prevented from flickering.

FIG. 5B shows a pattern of correcting the shutter speed in the case where the object luminance is increased. An alternate long and short dash line in FIG. 5B denotes changes in the object luminance estimated as shown in FIG. 5A. As shown by the left view of FIG. 5B, when the object luminance $L_2$ is darker than the estimated object luminance, the shutter speed is corrected so that an object luminance $L_3$ to be subsequently measured becomes equal to an object luminance estimated from an initial value based on a ratio of the average object luminance $L_0$ to the initially changed object luminance $L_1$. Furthermore, as shown in the right view of FIG. 5B, when the object luminance $L_2$ becomes brighter than the estimated object luminance, the shutter speed is also controlled so that an object luminance $L_3$ to be subsequently measured becomes equal to an estimated object luminance.

On the other hand, FIG. 5C shows a pattern of correcting the shutter speed in the case where the object luminance is reduced. The alternate long and short dash line denotes changes in an estimated object luminance in the same manner as in FIG. 5A. As shown in the left figure of FIG. 5C, when the object luminance $L_2$ becomes brighter than the estimated object luminance, the shutter speed is controlled so that an object luminance to be subsequently measured becomes equal to an object luminance estimated from an initial value based on a ratio of the average object luminance $L_0$ to the initially changed object luminance $L_1$. Furthermore, when the object luminance $L_2$ becomes brighter than the estimated object luminance, the shutter speed is controlled so that an object luminance to be subsequently measured becomes equal to an object luminance estimated in the same manner as described above.

Accordingly, even when the object luminance is minutely changed and measured, the object luminance is supposed to change at a constant ratio, and the shutter speed is corrected based on the supposition so that the focal luminance measured on the imaging plane is corrected. Consequently, the output screen can be prevented from flickering.

Furthermore, FIG. 5D shows a shutter speed correction patter in the case where white detection results in flickering. The alternate long and short dash line in FIG. 5D shows an average object luminance. Now suppose a case where when the object luminance is increased or decreased by white detection, the cause for the increase or decrease is subsequently eliminated such that the object luminance is decreased or increased. In this case, when the shutter speed is reversed by an amount of increase object luminance, the focal luminance is change to a large degree such that a large adverse effect is imparted to the output screen. In view of the problem, the following correction is executed. The left view of FIG. 5D shows a correction pattern in the case where an object luminance $L_1$ darker than the normal object luminance is measured and subsequently, the cause is rapidly eliminated such that an object luminance $L_2$ equal to the normal object luminance is measured. In this case, when the shutter speed is rapidly returned to the former, a change in the brightness becomes more remarkable. In view of this problem, a correction is made so as to result in reversal between positive and negative values at a predetermined smaller value relative to a ratio of change between the average object luminance $L_0$ and the object luminance $L_1$. Thus, the shutter speed in the case of the object luminance $L_2$ is corrected so that the change in the brightness is buffered. The right view of FIG. 5D shows a correction pattern in which a brighter object luminance $L_1$ is measured relative to the average object luminance $L_0$ and subsequently, the cause for the brighter object luminance $L_1$ is rapidly eliminated such that the object luminance $L_2$ is measured. In this case, too, the changes in the brightness are absorbed.

Figure 6:
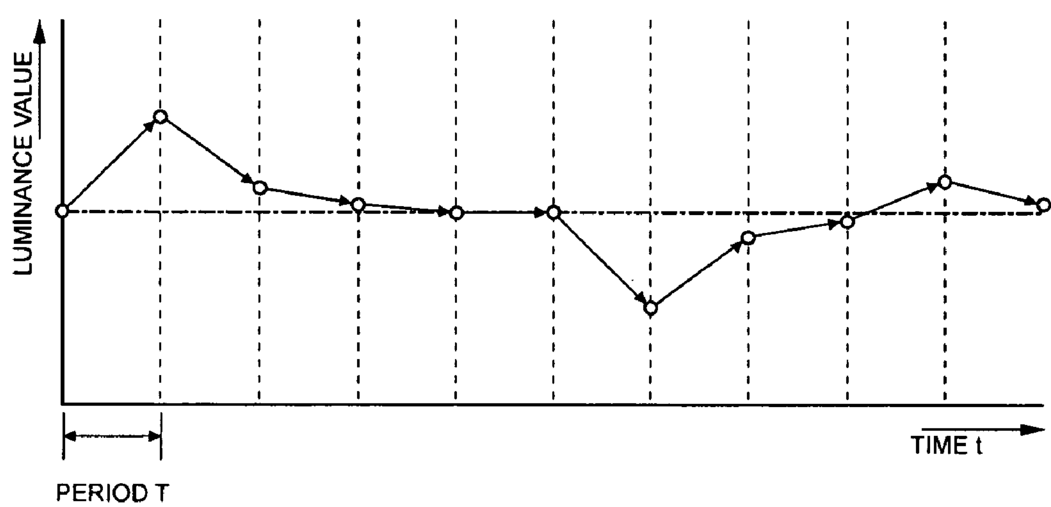
FIG. 6 shows a correction pattern of the focal luminance as shown in FIG. 3.
Figure 7:
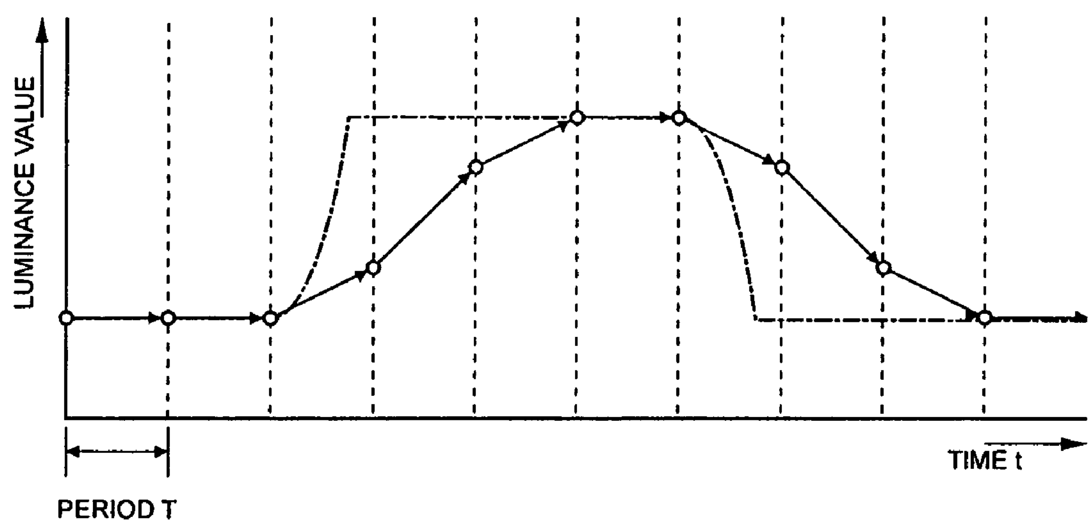
FIG. 7 shows a correction pattern of the focal luminance as shown in FIG. 4.

FIGS. 6 and 7 show changes in the focal luminance in the case where the correction patterns of FIGS. 5B to 5D are applied to the cases of FIGS. 3 and 4. When FIG. 6 is compared with FIG. 3, the change in the focal luminance is continuous to a large extent in FIG. 3. In the correction as shown in FIG. 6, a triangular waveform appearing in FIG. 3 gently converges in a rear part of the waveform. As a result, the change in the focal luminance becomes gentler and accordingly, the output screen can be prevented from flickering.

Furthermore, when FIGS. 7 and 4 are compared with each other, FIG. 4 shows that the focal luminance rapidly changes with delay relative to the object luminance. In the post-correction state in FIG. 7, the change in the focal luminance is rounded and pulse waveforms which are shown as trapezoidal in FIG. 4 are substantially semicircular. Accordingly, since the focal luminance is changed step by step, the output screen can be prevented from sudden change.

Thus, even when the object luminance has been changed by the changes in the external color environments, the shutter speed is corrected such that the changes in the focal luminance can be suppressed. Consequently, the output screen can be prevented from flickering and the brightness can be changed uniformly.

As obvious from the above-described AE control, when the focal luminance has suddenly been changed by the high-speed zooming or when the focal luminance has been changed by the changes in the external subject luminance, the shutter speed and frame rate are controlled so that the output image can be maintained at a contact value. Furthermore, although the exposure is controlled using a solid-state image sensing device such as CCD, CMOS and the like, the exposure control method of the embodiment can be applied to an AE control by an aperture mechanism (mechanical iris).

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A method of exposure control in an image pickup apparatus which includes sensing an image with a solid-state image sensing device, moving a zoom lens and a focus lens along a light axis, sensing a rate of white color in said image with a light receiving element, color correcting an image taken on the basis of a rate of white color contained in the taken image with a white balance changing unit, changing an exposure time based on color correction processing by the white balance changing unit by means of an automatic exposure control unit, changing a shutter speed and a frame rate of the image sensor, linking an autofocus control unit with the focus lens based upon movement of the zoom lens, and using a photometric unit comprising a light receiving element, the method further comprising:

determining whether or not the zoom lens has been moved, based on information about a zooming position of the zoom lens obtained from the autofocus control unit;

determining whether or not an F value obtained from information about a focal position of the focus lens linked to movement of the zoom lens has changed;

estimating variations in a focus luminance before and after a change in the F value based upon an F value before and an F value after when the F value has been changed;

changing the shutter speed according to a focus luminance before the change to a shutter speed and after the change in shutter speed; and changing a frame rate according to a focus luminance before a change in shutter speed and a focus luminance after a change in shutter speed.

2. The exposure control method according to claim 1, wherein when whether the zoom lens has been moved is determined based on information about the position of the zoom lens and the zoom lens has been determined to be in motion even in a case where the F value has not been changed, the frame rate determined according to the focus luminance before movement of the zoom lens is changed to a frame rate determined according to the focus luminance after the movement of the zoom lens, and the shutter speed determined according to the focus luminance before the position of the zoom lens is changed to a shutter speed determined according to the focus luminance after the movement of the zoom lens.

3. The exposure control method according to claim 1, wherein in a case where the object luminance monitored at a constant frequency by the photometric unit is changed even when the zoom lens has not been moved and the F value has been unchanged, the shutter speed is changed according to a ratio of consecutive two of the object luminance values whose changes are periodically detected.

4. The exposure control method according to claim 3, wherein:

the ratio has an initial value which is a first ratio of an average object luminance value obtained by averaging object luminance monitored by the photometric unit for a predetermined period of time and an object luminance value at which a change has initially been detected by photometric unit;

the shutter speed changed according to the initial value is set as a reference shutter speed;

a second ratio of a consecutive two of subsequently sequentially detected object luminance values is compared with the initial value; and the reference shutter speed is replaced by a shutter speed changed according to the second ratio when the second ratio does not correspond to the initial value.

5. An image pickup apparatus comprising:

an image sensor comprised of a solid-state image sensing device;

a zoom lens and a focus lens each moved along a light axis;

a light receiving element;

a white balance changing unit which carries out color correction for an image taken on a basis of a rate of white color contained in a taken image;

an automatic exposure control unit which changes an exposure time based on color correction processing by the white balance changing unit, a shutter speed and a frame rate of the image sensor;

an autofocus control unit which links the focus lens to movement of the zoom lens;

a photometric unit comprising a light receiving element;

a zooming detection unit which detects movement of the zoom lens;

an F value detection unit which detects information about a focal position of the focus lens moved in conjunction with the zoom lens, thereby detecting a change in the F value;

a focus luminance estimation unit which estimates a variation in the focus luminance on an imaging plane of the image sensor based on a movement distance of the zoom lens detected by the zooming unit, or an increase or decrease in an amount of light passing through the lens, the amount of light being detected by the F value detection unit;

a shutter speed change unit which changes the shutter speed during control by the automatic exposure control unit, based on an estimated variation in the focus luminance; and a frame rate change unit which changes the frame rate during control by the automatic exposure control unit, based on a movement distance of the zoom lens detected by the zooming detection unit.

* * * * *